United States Patent
Hultholm et al.

(10) Patent No.: US 9,322,079 B2
(45) Date of Patent: Apr. 26, 2016

(54) METHOD FOR RECOVERING COPPER FROM A COPPER SULPHIDE ORE

(75) Inventors: Stig-Erik Hultholm, Pori (FI); Leif Rosenback, Espoo (FI); Mika Haapalainen, Pori (FI)

(73) Assignee: Ourotec Oyj, Espoo (FI)

(*) Notice: Subject to any disclaimer, the term of this patent is extended or adjusted under 35 U.S.C. 154(b) by 479 days.

(21) Appl. No.: 12/279,567

(22) PCT Filed: Feb. 14, 2007

(86) PCT No.: PCT/FI2007/000036
§ 371 (c)(1),
(2), (4) Date: Aug. 15, 2008

(87) PCT Pub. No.: WO2007/093667
PCT Pub. Date: Aug. 23, 2007

(65) Prior Publication Data
US 2009/0078086 A1    Mar. 26, 2009

(30) Foreign Application Priority Data
Feb. 17, 2006    (FI) .................................... 20060150

(51) Int. Cl.
C22B 15/00    (2006.01)

(52) U.S. Cl.
CPC ......... C22B 15/0089 (2013.01); C22B 15/0071 (2013.01); Y02P 10/236 (2015.11)

(58) Field of Classification Search
CPC .................. C22B 15/0089; C22B 15/0071
USPC ........................................ 205/580; 75/718
IPC ..................................................... C22B 11/04
See application file for complete search history.

(56) References Cited

U.S. PATENT DOCUMENTS

| 3,959,436 A | 5/1976 | Watts |
| 4,115,221 A | 9/1978 | Wadsworth et al. |

(Continued)

FOREIGN PATENT DOCUMENTS

| WO | 9629439 | 9/1996 |
| WO | 9712070 A1 | 4/1997 |

(Continued)

OTHER PUBLICATIONS

Office Action dated Nov. 21, 2012 for corresponding Indian Application No. 2925/KOLNP/2008, 2 pages.

*Primary Examiner* — Weiping Zhu
(74) *Attorney, Agent, or Firm* — Chernoff, Vilhauer, McClung & Stenzel, LLP

(57) ABSTRACT

The invention relates to a method whereby copper is recovered from a copper sulphide ore containing pyrite. According to the method the ore is ground and leached into a solution containing sulfuric acid in atmospheric conditions by means of trivalent copper. As the copper sulphide leaches out, the trivalent iron is reduced to divalent and is oxidized back to trivalent by means of oxygen during leaching. Leaching is carried out in a closed reactor, where the undissolved gas rising from the solution in the supper section of the reactor is circulated back into the suspension of solution, solids and gas. leaching is performed in the presence of both divalent and trivalent iron and preferably with the dissolved copper acting as a catalyst to promote leaching. The conditions are adjusted to be such that the pyrite of the ore essentially does not dissolve.

21 Claims, 1 Drawing Sheet

(56) References Cited

U.S. PATENT DOCUMENTS 6,319,389 B1 11/2001 Fountain et al.
6,537,440 B1 * 3/2003 Richmond et al. ............ 205/580
6,793,816 B1 * 9/2004 Takala et al. .................. 210/219

FOREIGN PATENT DOCUMENTS

| WO | 0006784 | 2/2000 |
| WO | 2005118894 A1 | 12/2005 |

* cited by examiner

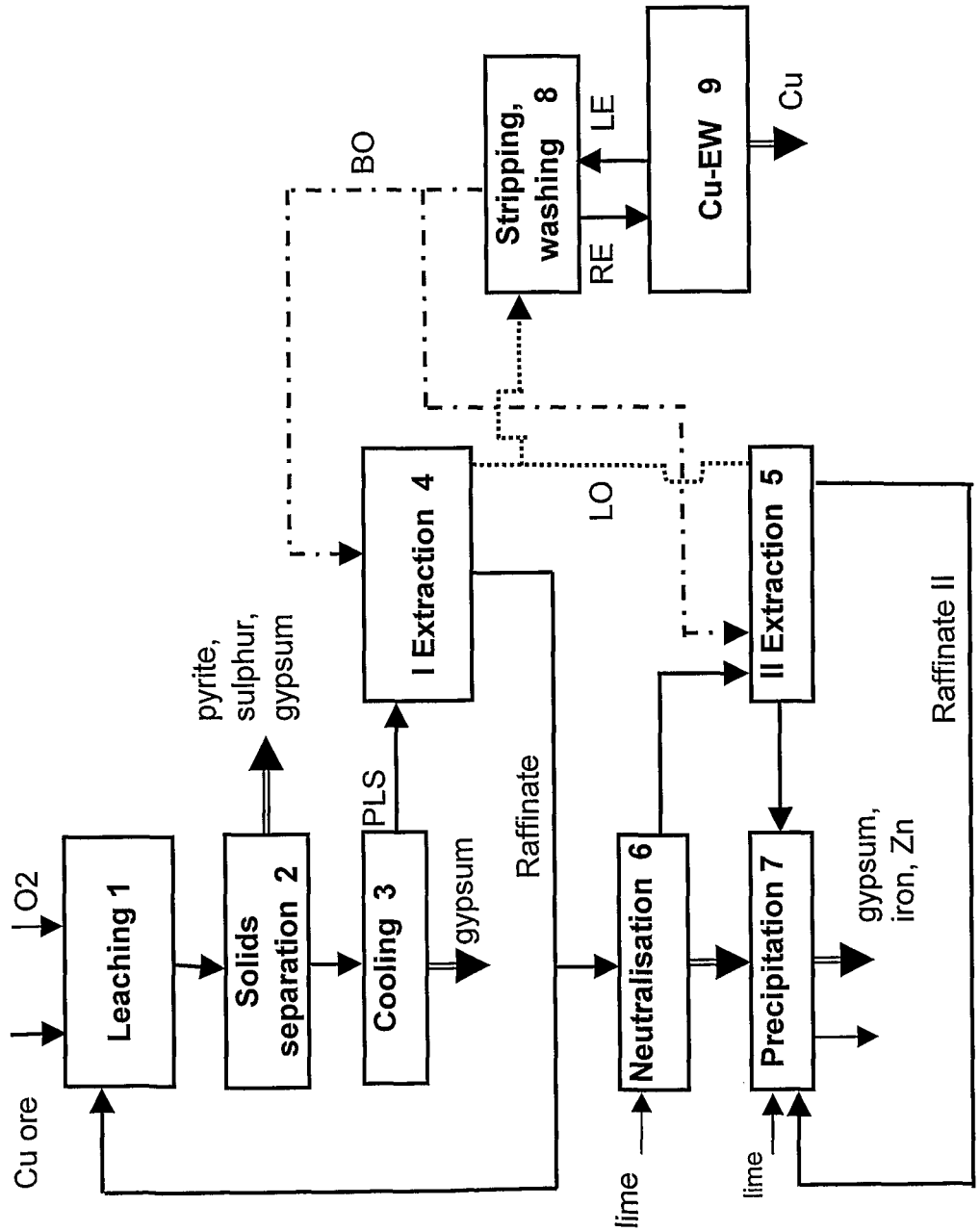

METHOD FOR RECOVERING COPPER FROM A COPPER SULPHIDE ORE

This is a national stage application filed under 35 USC 371 based on International Application No. PCT/FI2007/000036 filed Feb. 14, 2007, and claims priority under 35 USC 119 of Finnish Patent Application No. 20060150 filed Feb. 17, 2006.

FIELD OF THE INVENTION

The invention relates to a method whereby copper is recovered from a copper sulphide ore that containing pyrite. According to the method the ore is ground finely and leached into a solution containing sulphuric acid in atmospheric conditions by means of trivalent copper. As the copper sulphide leaches out, the trivalent iron is reduced to divalent and is oxidised back to trivalent by means of oxygen during leaching. Leaching is carried out in a closed reactor, where the undissolved gas rising from the solution in the upper section of the reactor is circulated back into the suspension of solution, solids and gas. Leaching is performed in the presence of both divalent and trivalent iron and preferably with the dissolved copper acting as a catalyst to promote leaching. The conditions are adjusted to be such that the pyrite essentially does not dissolve.

BACKGROUND OF THE INVENTION

A significant portion of ores that contain copper sulphide is chalcopyritic ore, $CuFeS_2$, of which the most common processing method after enrichment is pyrometallurgical smelting—anode casting—electrolytic purification. Nowadays however there is also interest in the hydrometallurgical processing of copper sulphide ores, whereby the first treatment stage itself is also commonly the formation of a flotation concentrate, after which usually at least one concentrate leaching stage takes place in autoclave conditions. The other primary occurrence of copper sulphide is chalcocite, $Cu_2S$, which is processed principally in the same way as chalcopyrite. Chalcopyrite and chalcocite generally occur in the same ore and often the amount of chalcopyrite is predominant.

The leaching of minerals containing chalcopyrite and/or chalcocite with the aid of trivalent iron in a solution containing sulphuric acid is described e.g. in WO publications 2005/042790 and 2005/005672. In both cases the oxidation of the divalent iron formed in leaching to trivalent is performed in autoclave conditions, although at least part of the concentrate leaching could be performed in atmospheric conditions. The copper sulphate solution formed in leaching is routed to conventional copper recovery.

A method for the hydrometallurgical recovery of copper from chalcopyrite and other sulphides is described in U.S. Pat. No. 4,115,221. In this method the sulphide mineral is ground to a fineness where the particle size is a maximum of one micrometer. The sulphidic solids are leached into an acidic solution, in which the amount of ferric ions is stoichiometrically sufficient to oxidise the copper contained in the copper sulphide material. Part of the iron is removed from the copper sulphate solution by precipitating the ferrous sulphate from it, after which the solution is routed to copper electrolysis. The solution exiting electrolysis, which is dilute in relation to copper, is routed to a separate stage, in which the ferrous iron still in solution is oxidised into trivalent before routing the solution back to sulphide leaching. In the method, the leaching and formation of trivalent iron used in leaching take place in different stages.

EP patent 815,270 describes a method for leaching sulphidic minerals, where the mineral also contains iron. According to the method, the mineral is ground to a fineness where the P80 is 20 microns or less. Leaching takes place by means of ferric iron and sulphuric acid in an open reactor and oxygen is fed into the reactor to oxidise the ferrous iron formed in sulphide leaching back into ferric iron. All the examples in the publication describe the treatment of flotation concentrate. The copper sulphate solution formed in leaching is routed to conventional extraction and electrowinning.

The drawback of the two last atmospheric methods described above is considered to be the fact that for leaching to succeed, the mineral has to be ground very fine, which consumes energy and thus raises grinding costs. In addition, it can be said of the latter method that with oxidation in an open reactor an excess of oxygen has to be fed in, because it cannot all be taken back into circulation.

PURPOSE OF THE INVENTION

The purpose of the invention is to eliminate the disadvantages of the methods presented above. A copper sulphide-bearing ore containing pyrite is fed to leaching in considerably coarser form than that described above, thereby saving grinding costs. The leaching of ore and oxidation of ferrous iron into ferric iron takes place with the aid of oxygen in the same stage in closed reactors in atmospheric conditions, so that the oxygen efficiency is made higher than in an open reactor. An acidic iron-containing solution is used for ore leaching, which in addition to ferrous and ferric iron also includes copper, which acts as a catalyst to promote leaching.

SUMMARY OF THE INVENTION

The essential features of the invention will be made apparent in the attached claims.

The invention relates to a method for leaching copper from a copper sulphide ore containing pyrite, whereby finely ground ore is leached into a solution containing sulphuric acid and iron in a single stage. The grain size of the ore is of the order of 95-100% below 150 µm. Oxygen is fed into the leaching stage and leaching is performed in atmospheric conditions with a solution having an iron concentration of around 20-50 g/l, of which the amount of ferric iron is at least 10 g/l and the amount of copper at the start of leaching is 8-12 g/l.

LIST OF DRAWINGS

A flow chart of the method accordant with the invention is shown in FIG. 1.

DETAILED DESCRIPTION OF THE INVENTION

The method accordant with the invention is particularly suitable for the leaching of chalcocite-type copper sulphide-pyrite ore, although of course it can also be adapted for the leaching of other sulphide ores. The method is described below with reference to FIG. 1. The purpose in the method is to leach sulphide ore in particular without enrichment pretreatment. The conditions of leaching stage 1 are adjusted to be such that as small a part as possible of the pyrite contained in the ore will dissolve. The ore is ground for leaching to a grain size of 95-100% below 150 micrometers and preferably to a size of around 50-150 µm so that it contains as little as possible of the finer fractions. The ground ore is fed into the first leaching reactor. The number of reactors in series in the leaching stage can vary according to need, but both ore leaching and the oxidation of ferrous iron into ferric iron takes place during the same stage.

The following reactions typically occur in the leaching of copper sulphide ore:

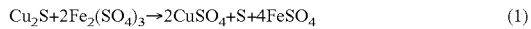
$$Cu_2S+2Fe_2(SO_4)_3 \rightarrow 2CuSO_4+S+4FeSO_4 \quad (1)$$

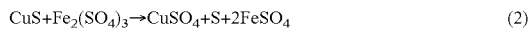
$$CuS+Fe_2(SO_4)_3 \rightarrow CuSO_4+S+2FeSO_4 \quad (2)$$

$$S+3Fe_2(SO_4)_3+H_2O \rightarrow 6FeSO_4+4H_2SO_4 \quad (3)$$

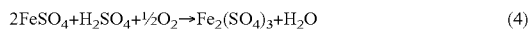
$$2FeSO_4+H_2SO_4+\tfrac{1}{2}O_2 \rightarrow Fe_2(SO_4)_3+H_2O \quad (4)$$

$$FeS_2+H_2O+3\tfrac{1}{2}O_2 \rightarrow FeSO_4+H_2SO_4 \quad (5)$$

A solution is used for leaching copper sulphide ore with a sulphuric acid concentration of at least 20 g/l, preferably 70-95 g/l. The total iron in solution is 20-70 g/l, where the amount of trivalent iron is at least 10 g/l, the $Fe^{3+}/Fe^{2+}$ ratio is preferably adjusted to the region of 0.5-1.2 and the amount of dissolved copper around 8-12 g/l at the start of leaching. Preferably the solution is extraction stage raffinate, from which the majority of the copper has been removed. When the solution used in leaching is the kind described above, it has been found that reactions 1, 2 and 4 proceed almost one hundred percent, but reaction 3 only around 5% and reaction 5 (dissolving of pyrite) around 3%. As can be seen from the reactions above, sulphuric acid is only generated in reactions 3 and 5 and all the rest of the sulphur is recovered as elemental sulphur.

When copper is present in the solution used for ore leaching, it aids the regulation of the oxidation-reduction potential of the leaching. Obviously, the copper concentration of the solution increases as the leaching proceeds, because the purpose is to leach the copper in the ore, but generally in leaching accordant with the prior art the copper concentration of the raffinate is low, in the region of less than 2 g/l.

The leaching potential is adjusted to be 450-550 mV vs. Ag/AgCl electrode at the end of leaching. The relatively high iron concentration in addition to the copper concentration facilitates the above-mentioned potential level adjustment. Potential adjustment also facilitates the limitation of pyrite dissolution, which consumes a lot of oxygen and increases the need for neutralisation.

Copper sulphide ore leaching takes place at a temperature of 85-95° C. The regulation of the reactor temperature is performed indirectly. One indirect temperature regulation mechanism is to use baffles, in which a medium, for instance steam or cooling fluid, is circulated. Another method is to equip the reactor with heating/cooling coils. The advantage of indirect regulation is the fact that no excess water is introduced into the leaching stage. The leaching mother liquor i.e. the extraction raffinate, is preheated to a temperature of 70-80° C. with the reaction heat generated in leaching.

Typically oxygen is fed into all the leaching stage reactors to oxidise the ferrous iron into ferric iron, but feeding oxygen into every reactor is not however absolutely essential. Oxygen can be fed as oxygen, oxygen-enriched air or air. By means of precise temperature control, the dissolving of pyrite can also be regulated and thus leaching costs restricted. Reactors are equipped with effective mixers, which keep the solids, liquid and gas in suspension. The effective mixing maintained in the reactors enables the feed of a fairly rough solid into the leaching stage. The oxidising gas is preferably fed below the mixing element, from where the mixer sucks it into the suspension. The mixing element is composed preferably of two blade mixers located on the same shaft, which are shaped in a way appropriate for the purpose. The tip speed of the mixer is adjusted to be less than 5 m/s, so that the mixer blades do not fundamentally wear out.

The reactors are equipped with a cover so that the gas that accumulates above the suspension can be circulated back into the suspension with the aid of the upper blade mixer and only the amount equivalent to the amount of gases other than oxygen in the gas is removed from the upper section of the reactor. The reactors are not however autoclaves but act in atmospheric pressure. The suspension flows from one reactor to another as an overflow.

The solution formed in leaching, which contains copper sulphate known as PLS (Pregnant Leach Solution), is routed to solids separation and cooling. Solids separation can be carried out for example in two stages such as thickening and filtration, but in the illustration for the sake of simplicity it is depicted as a single stage. The underflow of separation 2 consists of the gangue of the ore (silicates), undissolved ore such as pyrite, gypsum and a little elemental sulphur that is generated in the reactions. The overflow of separation 2 is copper sulphate solution, with a copper concentration of around 20-50 g/l, and in which there is still present about 20-70 g/l iron, partly in ferrous and ferric form, so that the ferric iron concentration is at least 10 g/l. The sulphuric acid concentration of the solution is of the order of 18-22 g/l.

The copper sulphate solution is routed to cooling 3, where the solution is cooled, so that its temperature is suitable for extraction. The ore generally always also contains a small amount of calcium and arsenic, and now by means of cooling, gypsum and ferric arsenate are precipitated out of the solution, so that they do not precipitate during extraction into the first extraction cell.

The copper sulphate solution is routed to liquid-liquid extraction, which is performed in two stages in accordance with the invention. The fact that the copper concentration of the raffinate exiting the first extraction stage can be left higher than normal, whereby the copper contained in the raffinate acts as a catalyst for leaching may be considered one advantage of two-stage extraction. Another advantage is the fact that, in connection with the second extraction stage, substances dissolved from the ore and/or harmful to leaching and extraction can be removed from the raffinate without great losses of copper. Any known copper extractant whatsoever is suitable as extractant, diluted into a suitable solvent such as kerosene. It is also beneficial for the method that the extractant concentration in the extraction solution is adjusted to be high, in the region of 35-45%. The passage of the extraction solution is depicted in the illustration by a dashed line, so the solution entering extraction, BO (barren organic), is shown by a dashed and dotted line and the copper-containing LO (loaded organic) solution exiting extraction is represented by a dotted line. In the first stage 4 of extraction, 65-75% of the copper content of the PLS is extracted into the extraction solution, whereupon the copper concentration of the aqueous solution to be removed from extraction i.e. the raffinate, remains 8-12 g/l. As the copper concentration of the raffinate has fallen, its sulphuric acid concentration has risen in accordance with the following reaction:

$$CuSO_4+2HR \rightarrow CuR_2+H_2SO_4 \quad (6)$$

In the reaction, R means the hydrocarbon part of the extractant, which forms a complex with the copper in the organic solution and the hydrogen ion part of the extractant forms sulphuric acid in the aqueous solution with the sulphate.

The majority, i.e. over 90% of the raffinate is routed back to ore leaching 1, but a small part, in the region of 3-8%, is routed to the second extraction stage 5. This part is adjusted according to requirements so that the iron concentration of the raffinate does not rise above 70 g/l or that its impurity content such as its zinc content does not rise too much. The raffinate to be routed to the second extraction stage is neutralised in neutralisation stage 6 before the extraction stage by means of a suitable neutralising agent such as lime or limestone. Before neutralisation the sulphuric acid concentration of the solution is around 60-70 g/l and it is neutralised to a pH value of 1.6-1.8, so that the solution is suitable for extraction. In the second extraction stage, copper is removed from the solution until the concentration is around 0.5 g/l or even smaller. The raffinate solution II from the second extraction stage is removed from the circuit via precipitation stage 7, whereupon the zinc and iron that dissolved from the ore during leaching are precipitated from the solution, i.e. mainly the iron of the pyrite, for example by means of lime. The deposit from neutralisation 6, which is mainly gypsum, is also routed to the precipitation stage. The precipitate and solution formed are removed and processed in an appropriate manner.

The LO solutions from both extraction stages, containing an abundance of copper, are combined and routed to the washing and stripping stages, which are depicted together as reference number 8. The aqueous solution exiting stripping, which is the RE (rich electrolyte) to be routed to electrolysis 9, contains around 45-50 g/l copper. Electrolysis is a conventional electrowinning. The LE (lean electrolyte) exiting electrolysis is recirculated as the aqueous solution for stripping.

EXAMPLES

Example 1

In a test we leached copper sulphide-pyrite ore that had been ground to a fineness of 95% below 150 microns. Leaching was carried out in five reactors arranged in series and leaching occurred at a temperature of 90° C. Leaching took place by means of recirculated raffinate from the first extraction stage. Leaching time was 9 h and during this time 91.8% of the copper dissolved. The analysis of the ore was as follows:

TABLE 1

| Substance | Amount, wt-% |
| --- | --- |
| Cu | 6.09 |
| Fe | 30.70 |
| Zn | 0.20 |
| As | 0.32 |
| S | 36.9 |
| Si | 10.83 |
| Ca | 1.02 |

The analyses of the raffinate used for leaching and the PLS formed in leaching are given in Table 2.

TABLE 2

| Substance | Raffinate g/l | PLS g/l |
| --- | --- | --- |
| Cu | 12.3 | 40.8 |
| Fe | 48.6 | 48.5 |
| $Fe^{2+}$ | 24.8 | 24.7 |
| $Fe^{3+}$ | 23.8 | 23.8 |
| $H_2SO_4$ | 63.8 | 19.9 |
| $Cl^-$ | 0.7 | 0.7 |

The leaching stage reactors were equipped with baffles, where steam was routed inside the first reactor baffles to heat the reactor space. The raffinate was heated before being fed into the leaching stage with heat recovered in PLS cooling, but the final temperature control of the solution was performed by means of baffle steam. Since the reactions occurring in leaching are exothermic, the subsequent reactors were cooled by means of the cooling fluid flowing in the baffles. The solution flowed from one reactor to another by gravity. The reactors were mixed with the aid of double-bladed mixers and the oxygen required for oxidising iron was fed below the mixer. The redox potential of the leaching stage was adjusted to be a value of 400-550 mV vs. Ag/AgCl electrode.

The suspension of solution and solids to be removed from the last leaching reactor was routed to thickening. The composition of the thickener underflow was as follows: Cu 0.55%, Fe 31.1% and Zn 0.1%.

The thickener overflow was a copper-rich PLS, which was routed to cooling prior to extraction. The solution was cooled to a temperature below 38° C., to make it suitable for extraction. In connection with the cooling of the solution gypsum and ferric arsenate were precipitated from it, and were removed from the solution by means of thickening and filtration.

The extraction of the PLS was carried out in two stages, the first of which comprised two extraction cells in series. The copper concentration of the PLS was 40 g/l. The extractant concentration used for the BO organic extraction solution was 40%. During the first extraction stage about 70% of the copper in the PLS was extracted into the organic solution and the copper concentration of the remaining raffinate was about 12 g/l.

The raffinate from extraction was mostly recirculated back to ore leaching, but about 6% of it was routed to the pre-neutralisation preceding the second extraction stage, which aids the control of the iron and zinc content of the solution circulating in the leaching and extraction circuit. In addition to the raffinate, the wash waters of various precipitates were routed to pre-neutralisation so that the Cu concentration of the solution became 7.2 g/l. Solution neutralisation was carried out with lime from an $H_2SO_4$ concentration of 80 g/l to a pH value of 1.6-1.8. The clear solution resulting from solids separation was routed to the second extraction stage, which comprised a single extraction cell. The extraction solution used was the same extraction solution as that in the first extraction stage. In the second stage, 93% of the copper contained in the aqueous solution was extracted, so that the Cu concentration of the solution to be removed from this stage was only 0.5 g/l.

The organic solutions rich in copper exiting both extraction stages were combined and routed to the stripping and washing stage, which consisted of two stripping cells, one extraction solution washing cell and an organic LO solution tank. During the washing stage the chlorides and ferric iron contained in the solution were removed from the organic solution with a water wash.

In the stripping cells copper was extracted from the organic solution into an aqueous solution, which was the lean electrolyte LE exiting copper electrowinning. The aqueous solution exiting stripping was an electrolyte rich in copper (RE), which was routed to electrolysis.

Example 2

In a test we leached copper sulphide-pyrite ore that had been ground to a fineness of 95% below 150 microns. Leaching was carried out in one reactor at a temperature of 90° C. The leaching reactor was equipped with baffles. The mixing element was equipped with both an upper and lower mixer. The upper mixer was an A-type and the lower mixer a GLS-type. Leaching time was 8 h. A synthetic leaching solution corresponded to an extraction raffinate, in which the $Fe^{3+}/Fe^{2+}$ ratio was adjusted to a value of 0.75:1. The solution was preheated before being fed into the leaching reactor. The solids content of the slurry in the reactor was adjusted to 400 g/l. The oxygen feed amount in the test was a constant 80 ml/min/l (slurry). The analyses of the ground ore and leaching solution were as follows:

TABLE 3

| Substance | Ore, wt-% | Leaching solution concentration, g/L |
|---|---|---|
| Cu | 7.8 | 10 |
| Fe | 34.9 | 49.8 |
| $Fe^{3+}$ | — | 21.4 |
| $Fe^{2+}$ | — | 28.4 |
| Zn | 0.076 | 6 |
| As | 0.47 | — |
| S | 42.7 | — |
| $SiO_2$ | 10.6 | — |
| Ca | 0.39 | — |
| $H_2SO_4$ | — | 85 |

In this test 93.9% of the copper dissolved. There was 41.5 g/l copper, 49.4 g/l iron and 21.1 g/l sulphuric acid in the leaching product solution. Consequently the composition of the product solution cooled to <38° C. is a suitable feed solution as such for the following sub-process i.e. copper extraction. The analysis of the solids separated from the slurry, the leaching residue, after leaching is presented in Table 4.

TABLE 4

| Substance | Leaching residue, wt-% |
|---|---|
| Cu | 0.42 |
| Fe | 35.7 |
| Zn | 0.06 |
| As | 0.45 |
| S | 44.4 |
| $SiO_2$ | 11 |
| Ca | 0.22 |

Example 3

In a test a copper-rich PLS obtained from leaching was fed into an extraction system, which consisted of two extraction cells, a loaded organic LO tank, a washing cell and two stripping cells. The extraction system operates on the countercurrent principle. The amount of organic phase extractant was 45 vol %. The temperature of all the different solutions was 35° C.

In extraction 74% of the copper contained in the PLS transferred to the organic phase. Water droplets were removed from the loaded organic phase in the LO tank. Ferric iron was washed out of the organic phase loaded with copper in the washing cell with acidic wash water. In stripping the copper was removed from the loaded organic phase with an electrolyte solution (LE), forming an electrolyte solution rich in copper (RE). Both test product solutions were suitable for further processing; the raffinate as a mother liquor for leaching and the RE for electrolysis.

The analyses of the leaching product solution or PLS, the feed solution of leaching or extraction raffinate, stripping feed solution (LE) and stripping product solution (RE) are presented in Table 5.

TABLE 5

| Substance | PLS, g/l | raffinate g/l | LE, g/l | RE, g/l |
|---|---|---|---|---|
| Cu | 34 | 9 | 35 | 47 |
| Fe | 53 | 53 | 0.19 | 0.2 |
| $Fe^{2+}$ | 37 | | | |
| $Fe^{3+}$ | 15.8 | | | |
| $H_2SO_4$ | 25 | 61 | 169 | 153 |

The invention claimed is:

1. A method for leaching copper from a copper sulphide ore that contains pyrite, comprising:
   grinding the copper sulphide ore to a coarseness of 95-100% below 150 μm,
   providing a leaching solution containing a minimum of 20 g/l sulphuric acid, about 20-70 g/l iron, of which at least 10 g/l is ferric iron, and 8-12 g/l copper,
   leaching the ground ore under atmospheric pressure with said solution, such that the copper content in said solution promotes regulation of an oxidation-reduction potential of said leaching, and
   oxidizing a part of the iron in the leaching solution during the leaching.

2. A method according to claim 1, comprising carrying out the leaching at a temperature in the range 85-95° C.

3. A method according to claim 1, comprising carrying out the leaching in closed reactors.

4. A method according to claim 1, comprising feeding oxygen to the leaching stage.

5. A method according to claim 1, comprising grinding the copper sulphide ore to a grain size in the region of 50-150 μm.

6. A method according to claim 1, comprising adjusting the $Fe^{3+}/Fe^{2+}$ ratio of the solution entering leaching to the region of 0.5-1.2.

7. A method according to claim 1, comprising adjusting the oxidation-reduction potential at the end of the leaching stage to be 450-550 mV vs Ag/AgCl.

8. A method according to claim 1, wherein a copper-rich aqueous solution exits the leaching stage and the method comprises routing the copper-rich aqueous solution to liquid-liquid extraction.

9. A method according to claim 8, comprising cooling the copper-rich aqueous solution prior to liquid-liquid extraction.

10. A method according to claim 8, comprising cooling the copper-rich aqueous solution prior to liquid-liquid extraction to an extent such that gypsum and ferric arsenate are precipitated from the copper-rich aqueous solution.

11. A method according to claim 8, wherein the liquid-liquid extraction has at least first and second stages and the method comprises recirculating a major part of the raffinate of the first extraction stage back to the leaching stage as the leaching solution and cooling the copper-rich aqueous solution prior to liquid-liquid extraction by transfer of heat to the raffinate being recirculated back to the leaching stage.

12. A method according to claim 8, wherein the liquid-liquid extraction has at least first and second stages and the method comprises recirculating over 90% of the raffinate of the first extraction stage back to the leaching stage as the leaching solution and routing the remainder to the second extraction stage.

13. A method according to claim 12, wherein the raffinate of the first extraction stage has a sulphuric acid content of 60-70 g/l and the method comprises neutralizing the sulphuric acid content of the raffinate of the first extraction stage to a pH value of 1.6-1.8.

14. A method according to claim 13, wherein comprising neutralizing the sulphuric acid content of the raffinate of the first extraction stage by means of lime or limestone.

15. A method according to claim 8, wherein the liquid-liquid extraction has at least first and second stages, the method comprises recirculating a major part of the raffinate of the first extraction stage back to the leaching stage as the leaching solution, and the copper concentration of the raffinate exiting the second extraction stage is around 0.5 g/l.

16. A method according to claim 1, comprising performing the leaching in several closed reactors connected in series, and wherein at least one of the reactors is provided with a mixing element and the method comprises feeding an oxygen-containing gas into said one reactor below the mixing element of the reactor.

17. A method according to claim 16, wherein the mixing element is composed of two mixers located on a common shaft in order to form a suspension of solids, liquid and gas.

18. A method according to claim 1, comprising performing the leaching in several closed reactors connected in series, and wherein at least a first of said reactors is equipped with baffles and the method comprises adjusting the temperature of the first reactor by means of an agent fed inside the baffles.

19. A method according to claim 1, comprising performing the leaching in at least one closed reactor and feeding an oxygen-containing gas into said one reactor.

20. A method according to claim 1, comprising supplying the ground ore to a reactor, supplying said leaching solution to the reactor separately from the ground ore, and leaching the ground ore in the reactor.

21. A method for the leaching of copper from a copper sulphide-pyrite ore, whereby the finely-ground ore is routed to a solution containing sulphuric acid and iron, which is oxidised during leaching, characterised in that the copper sulphide ore is ground to a coarseness of 95-100% from 50-150 μm and routed to a leaching stage in a closed reactor, which occurs in atmospheric conditions and in which leaching is carried out with a solution, the iron concentration of which is around 20-70 g/l, of which the amount of ferric iron is at least 10 g/l, the amount of copper at the start of leaching is 8-12 g/l to regulate and facilitate the leaching of copper from the copper sulphide-pyrite ore, and the $H_2SO_4$ concentration a minimum of 20 g/l.

\* \* \* \* \*